US012793521B2

(12) United States Patent
Rosenberg

(10) Patent No.: US 12,793,521 B2
(45) Date of Patent: Nov. 10, 2026

(54) EMERGENCY ASSISTANCE SYSTEM

(71) Applicant: Maepl Home, Inc., Eugene, OR (US)

(72) Inventor: Reed Rosenberg, Eugene, OR (US)

(73) Assignee: Mapel Home, Inc., Eugene, OR (US)

( * ) Notice: Subject to any disclaimer, the term of this patent is extended or adjusted under 35 U.S.C. 154(b) by 0 days.

(21) Appl. No.: 19/541,906

(22) Filed: Feb. 17, 2026

(65) Prior Publication Data

US 2026/0245440 A1 Aug. 20, 2026

Related U.S. Application Data

(60) Provisional application No. 63/759,891, filed on Feb. 18, 2025.

(51) Int. Cl.
*G08B 7/06* (2006.01)
*H04W 4/90* (2018.01)

(52) U.S. Cl.
CPC .............. *G08B 7/062* (2013.01); *H04W 4/90* (2018.02)

(58) Field of Classification Search
CPC ................................. G08B 7/062; H04W 4/90
See application file for complete search history.

(56) References Cited

U.S. PATENT DOCUMENTS 4,638,297 A * 1/1987 Roots ..................... G08B 25/12 340/308
6,044,257 A * 3/2000 Boling .............. H04M 1/72424 455/415
6,142,649 A * 11/2000 Beghelli ................. F21V 17/02 362/259
7,408,476 B1 * 8/2008 Beaton ................. H01H 9/0271 340/693.11
8,701,718 B1 * 4/2014 Turiello ................. G08B 21/18 141/2
9,514,622 B1 * 12/2016 Maclaskey ............. G08B 25/10
9,697,720 B1 * 7/2017 Lassiter ................... H04N 5/77
11,087,613 B2 * 8/2021 Barber ..................... G08B 5/36
11,393,316 B1 7/2022 Rooney
11,422,435 B1 * 8/2022 Sathe ................... G03B 11/041
11,682,291 B1 * 6/2023 Dugenske ............... H04W 4/90 340/539.13
11,810,447 B1 * 11/2023 Riley ................ H04M 1/72412
2006/0003809 A1 1/2006 Boling et al.
2007/0063821 A1 * 3/2007 Finkle .................... G08B 25/12 340/287

(Continued)

OTHER PUBLICATIONS

Msiplex, CT102 Wearable Panic Button—Wireless Emergency Alert, https://www.visiplex.com/product/wearable-panic-button/?srsltid=...fb3d522dc163aeadb66e08cd7450cbbdddc64c6cf2e8891f6d48747c6d56d2c, Feb. 11, 2026, 8 pages.

(Continued)

*Primary Examiner* — Timothy R Newlin
(74) *Attorney, Agent, or Firm* — SoCal IP Law Group LLP; Jonathan Pearce; Jonathan P. Gutierrez

(57) ABSTRACT

There is disclosed an emergency assistance system including an emergency device body, made up of a housing, a button for initiating emergency assistance, and a microphone for communicating with emergency services. The body is covered by an emergency device cover, entirely covering the button, thereby preventing inadvertent engagement with the button.

6 Claims, 11 Drawing Sheets

© 2026 Maepl Home, Inc.

(56) References Cited

U.S. PATENT DOCUMENTS

2009/0136006 A1* 5/2009 Milton .................... H04W 8/20 455/414.1
2009/0203350 A1* 8/2009 Gottlieb ............... G08B 25/005 455/404.1
2010/0124900 A1* 5/2010 Lui ....................... H04W 76/50 455/404.2
2011/0111728 A1* 5/2011 Ferguson ................ H04W 4/90 455/404.1
2013/0129338 A1* 5/2013 Dowell .................... G02B 1/14 359/511
2015/0289088 A1* 10/2015 Terrazas ................ H04W 24/10 455/404.2
2015/0339913 A1* 11/2015 Lyman ................... G08B 17/02 340/287
2016/0065721 A1* 3/2016 Fiedler ................... G08B 25/12 455/404.1
2016/0227361 A1* 8/2016 Booth ................... H04W 4/029
2016/0260308 A1* 9/2016 Tanner .................... B60R 22/48
2017/0117928 A1* 4/2017 Chien .................... G04G 17/04
2017/0206763 A1* 7/2017 Scully .................. G08B 15/004
2017/0310802 A1* 10/2017 Pitts ........................ H04W 4/90
2018/0049011 A1* 2/2018 Cantrell .................. H04W 4/02
2019/0007377 A1* 1/2019 Bender ............... H04L 12/1895
2019/0066469 A1* 2/2019 Adler ................... G08B 27/001
2019/0069145 A1* 2/2019 Dantsker ............... G06F 40/169
2019/0069154 A1* 2/2019 Booth ..................... H04W 4/90
2019/0104393 A1* 4/2019 Lhamon ................. G08B 25/08
2019/0342742 A1* 11/2019 Piett .................. H04M 3/42357
2020/0043314 A1* 2/2020 Wang .................. E05B 73/0029
2020/0252779 A1* 8/2020 McFadden ........ H04M 1/72424
2020/0259944 A1* 8/2020 Hoggeg .................. H04W 4/12
2020/0334972 A1* 10/2020 Gopalakrishnan ........................... G06Q 10/1093
2021/0072803 A1* 3/2021 Lai ........................ G06F 1/1656
2021/0400457 A1* 12/2021 Mgbenka .............. B60R 25/102
2022/0038576 A1* 2/2022 Martino ................. H04M 11/04
2022/0141328 A1* 5/2022 Baek ....................... G06F 40/58 455/404.1
2022/0334618 A1* 10/2022 Magi ..................... G06F 1/1656
2023/0274627 A1* 8/2023 Soares ............. G08B 13/19632 396/428
2024/0078890 A1* 3/2024 Luu .................... G08B 21/0453
2025/0008311 A1* 1/2025 Carrillo ................. H04W 4/029
2025/0046171 A1 2/2025 Nelson

OTHER PUBLICATIONS

Wahsega, IP Panic Button with Mic, https://wahsega.com/products/ip-intercoms/ip-panic-button/, Feb. 11, 2026, 4 pages.

Viking Electronics, Inc, Emergency Phone Panic Button—Model: PB-3, https://vikingelectronics.com/?s=EMERGENCY+PHONE+PANIC+BUTTON+PB-3, Feb. 11, 2026, 7 pages.

Assistive Technology Services LLC, Touch N Talk Medical Alert with Fall Detection—TNTFD, https://www.assistivetechnologyservices.com/TouchNTalkFD.html, Feb. 11, 2026, 9 pages.

IP Phone Warehouse, Viking PB-3 Analog Emergency Phone Panic Button, https://www.ipphone-warehouse.com/viking-pb-3-emergency-phone-p ...sltid=AfmBOoqUboV2krPbU_Oly1sgz0TAhs1tAi4nK5PM7cf5JS_hOazsrTu, Feb. 11, 2026, 3 pages.

Punch Rescue, Wearable Panic Button—Punch Rescue, https://punchrescue.com/rock/wearable-panic-button/, Feb. 11, 2026, 10 pages.

Silent Beacon, LLC, Wearable Panic Buttons for Offices, https://silentbeacon.com/? srsltid=AfmBOoqzXzJB7DcARQkhRxqW5qboPHJO0_bnZt0wLqjlaTBqrt69S04n, Feb. 11, 2026, 22 pages.

Alertus Technologies LLC, WiFi Panic Button, https://www.alertus.com/wifi-panic-button, Feb. 11, 2026, 9 pages.

World Intellectual Property Organization, International search Report and Written Opinion for International Application No. PCT/US26/15543, mail date May 12, 2026, pp. 1-15.

* cited by examiner

© 2026 Maepl Home, Inc.

© 2026 Maepl Home, Inc.

© 2026 Maepl Home, Inc.

© 2026 Maepl Home, Inc.

© 2026 Maepl Home, Inc.

© 2026 Maepl Home, Inc.

© 2026 Maepl Home, Inc.

© 2026 Maepl Home, Inc.

© 2026 Maepl Home, Inc.

© 2026 Maepl Home, Inc.

© 2026 Maepl Home, Inc.

EMERGENCY ASSISTANCE SYSTEM

RELATED APPLICATION INFORMATION

This patent claims priority from United States provisional patent application Ser. No. 63/759,891 filed Feb. 18, 2025 and entitled "Emergency Assistance System."

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to requests for assistance and, more particularly, to an emergency assistance system.

Description of the Related Art

The 911 system prevalent in the U.S. and Canada has been in place since the 1980s. Since then, the Federal Communications Commission has required that all local telephone carriers provide 911 service, including the ability to identify the location of the number from which the emergency call originated. Since the late 1990s, cellular phones have been required to incorporate global positioning system (GPS) chips so that users of mobile devices likewise can be located in an emergency. Since early childhood, parents, teachers, and first responders train and teach children that dialing "911" is the way to reach emergency services should something happen and they need support, assistance, or emergency aid.

At the same time, home telephone services are all-but gone. Where children used to be taught to run to the rotary phone, later a pushbutton phone, and dial "911," there remains no in-home phone to be used. Many mobile phone software makers have incorporated "emergency call" services into their lock screens, because dial pads are typically not available to locked phones. And, since smartphones incorporate or provide access to so many private and confidential documents and other information, they have increasingly become secured against third party snooping or theft. As a result, the process to make an emergency call with a mobile device has devolved. There is no standard and simple way to do so.

Though individuals almost always have phones with them, and in that sense, safety has increased, the process for activating emergency services has devolved into complexity and obscurity. On an iPhone®, a user must depress the "lock" and "volume up" button simultaneously for a period of approximately five seconds, then must swipe, left-to-right on a slider entitled "SOS emergency call." Or, a user can repeatedly fail to unlock a phone, which then presents "emergency call" as an option in the bottom left. Thereafter, the phone confirms that the user wishes to place an emergency call, then the 911 services are contacted. There are multiple steps, convoluted, and the steps assume one is sighted and able to read the words "emergency call" and understand what they mean.

The width of a typical iPhone is more than 2.8 inches. A child's hand may not be able to easily wrap around the iPhone to depress two buttons simultaneously, or it may require two hands to activate. What's more, a four year old may not even realize the procedure, particularly in a panicked state, and may not understand the use of "sliders" on the on-screen images at all, much less the "SOS" meaning or be able to read the words "emergency call". It would be unusual for a young child to know the word "emergency" at all. Other phones, like Android® phones, follow a different procedure. In this context, it is impossible to instruct a child in the process of seeking emergency aid if needed, and if a parent or other adult is unavailable-potentially the injured or party needing assistance.

So, though the ubiquity of mobile devices in most cases has made some users safer, namely adults with those mobile devices, it has simultaneously reduced availability to emergency services for children in particular. Or, in situations where an individual may not have access to a mobile device readily or may simply not know how to activate emergency services at all. The simplicity and ubiquity of landline "911" service has given way to a multitude of complex procedures that do not match one another and lead to the potential, if not actuality, of emergency services being slower to arrive, if at all, in some important situations.

Some services have offered "panic buttons" that a user wears on his or her body or places in a pocket or purse. These may dial emergency services or otherwise alert emergency services. These typically work through integration with alarm systems, and sometimes include microphones. Other "panic button" like devices are effectively mobile phones or integrate with existing wireless internet (e.g., 802.11x wifi) to provide some kind of emergency response. Typically, these devices rely upon an intermediary monitoring service, like an alarm company, which in turn may contact local emergency services. These intermediary services waste precious time. Other services utilize Bluetooth® or similar functionality that interact with a user's mobile device which, in turn, has cellular and wireless connectivity. The problem with these devices is that to access most of the functionality, the user's mobile device must be unlocked or activated and within range of the connected device to operate. It is very unlikely children will have access to, keep on their person at all times, or otherwise be aware of the function of such devices. And, as above, children are often locked out of mobile devices of their parents or other adults. In such situations, these devices may fail to work at all, or may indicate that they are working when they are not, making the emergency situation all the more dangerous as the people involved believe they have requested aid, but they have not as precious time slips away.

DETAILED DESCRIPTION

Description of Apparatus

What is needed is an easy-to-use and easy-to-access emergency assistance system that can be ever present in a home, school, remote location, or office and that provides the same simplicity of use and access that was the original intent of the 911 system solidified in the 1980s. In particular, it needs to be easily recognizable, easy to access, simple to activate, and connect an activating user directly with emergency services as if the user had dialed 9-1-1 from a landline. Of particular concern, but not the only concern, is the ability of a very young child to activate the system as needed, and the ability of a parent, teacher, or other adult to easily show a child how to recognize, activate and use the emergency assistance system with a minimum of steps.

To accomplish those things, a suitable system should be in a fixed location (e.g., not generally movable) so that a child will know where to reach the system in an emergency. Such a system preferably should incorporate multiple types of internet access to enable communication in the event of a power outage or other issue making one of the types inaccessible. Such a system should be clearly labelled as an emergency system to enable it to be found. Such a system should incorporate battery power to ensure it is available in an emergency when electrical power is unavailable. Such a system should incorporate a cover to ensure that a button readily accessible to a child (e.g., at child height) is not inadvertently activated or activated by a child's curiosity. Such a system should have a readily-detectible way of determining if it is functioning-preferably at a glance. Preferably, such a system would incorporate high-contrast lettering informing users as to its function from a distance, including the familiar 911 moniker, and potentially should include Braille text to assist sight impaired individuals in using the system.

Figure 1:
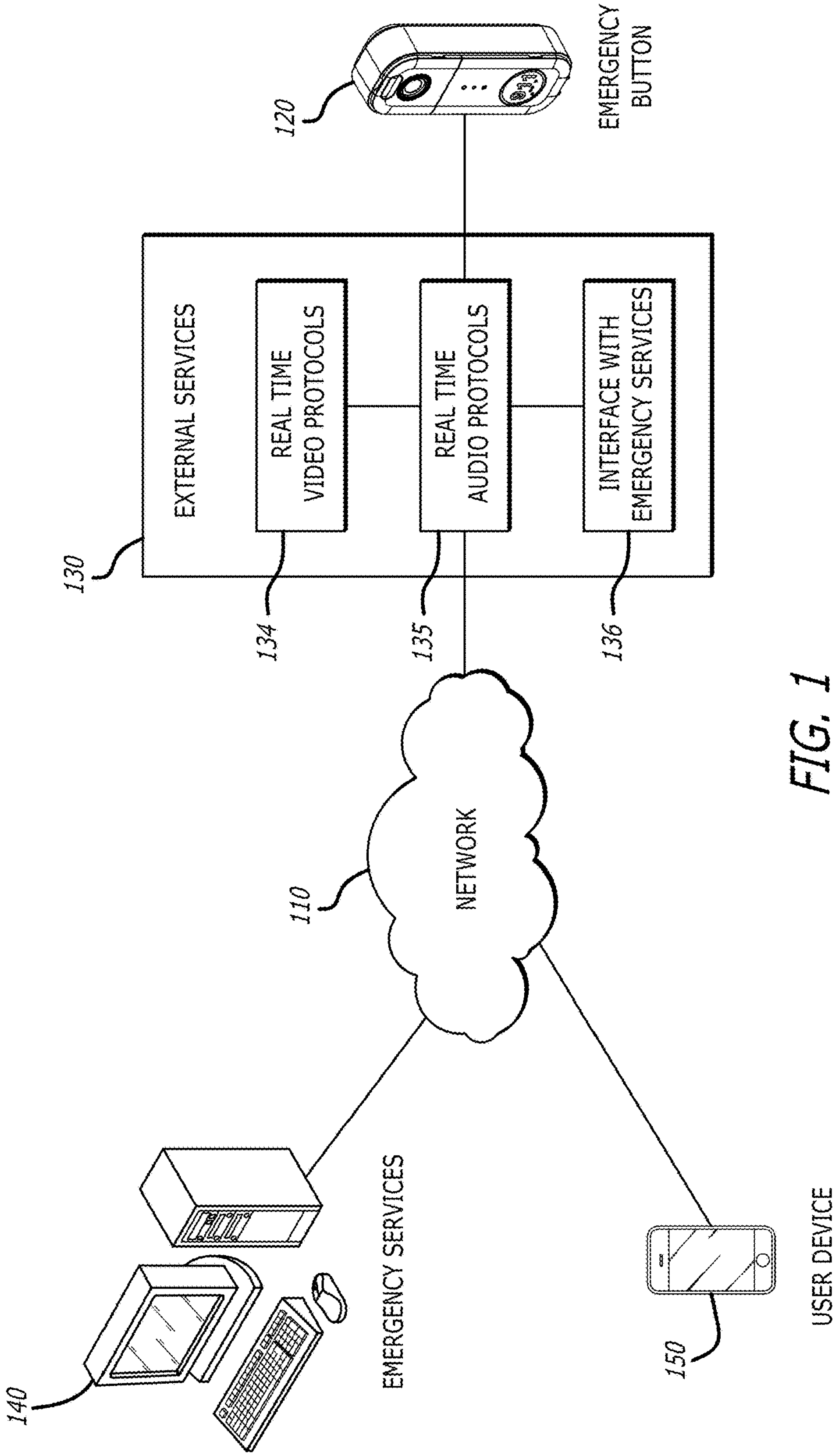
FIG. 1 is an overview of an emergency assistance system.

Referring now to FIG. 1, an overview of an emergency assistance system 100 is shown. The system 100 includes a network 110, an emergency button 120, external services 130, an emergency service 140, and one or more user's devices, like user device 150.

The emergency button 120 is a multi-component computing device (FIG. 2) that incorporates hardware suitable to enable a user to press a button, trigger an emergency services response, communicate with emergency services (e.g., a microphone, speaker, and camera), to illuminate the immediately-surrounding area so that the camera may function in low light, and to provide ongoing status information regarding the availability of the emergency button 120 and emergency services. The emergency button 120 is intended to be placed in a fixed location (in some cases, the emergency button 120 may be movable), for example, mounted to a wall or within a wall.

To accomplish some of the tasks, the emergency button 120 may rely upon various external services 130. The external services 130 are only "external" in the sense that the preferred system for offering these services is to provide them via a cloud service. The software to provide these functions may be custom made, or may integrate off-the-shelf software-as-a-service (SaaS) services that provide the described functions. In other cases, or depending upon the computing capabilities of the processor(s) integrated into the emergency button 120 itself, some or all of these functions may be integrated directly into the emergency button 120, rather than being provided by external services 130. Still further alternatively, these services may be provided by the proprietor of the emergency button 120 itself, but may be provided in the form of a cloud-based service, accessible to the emergency button 120.

Among others (discussed with reference to FIG. 3), the external services 130, which may be or include one or more computing devices (FIG. 2) provide real time video protocols 134, real time audio protocols 135, and the interface with emergency services 136. The real time video protocols 134 and real time audio protocols 135 enable video and audio communication with emergency service 140 using the emergency button 120. The video protocols 134 capture video using one or more integrated cameras within the emergency button 120 housing. One example of such a protocol is web real-time communications protocol (WebRTC) which is open source, inexpensive, high quality, easily and quickly handshakes for calls, is scalable, and enables efficient use of bandwidth which may be limited in emergency situations. Other protocols may be suitable as well, both those presently existing and those that may be developed in the future. The audio protocols 135, when integrated with firmware or software available on the emergency button 120, enable the emergency button 120 to capture voice and other sounds from the vicinity of the emergency button 120 and to provide those to emergency service 140. Likewise, these same audio protocols 135 enable the emergency services to communicate with the emergency button 120. Session initiation protocol (SIP) may be used for the audio portion of the communications, for many of the same reasons as WebRTC. But, other protocols may likewise be used.

The interface with emergency services 136 is a conduit through which audio and video and other data may be passed to emergency services 140. For example, there are often installed software or SaaS-based services that are sold as packages to government entities for operating as a 911 service. These packages integrate telephony, text, maps, internet browsers, video, and access to dispatch services of local law enforcement, fire and ambulance services. In this way, a 911 operator can access all information needed to aid emergency services in reaching an individual in the midst of an emergency and in understanding the state of the situation at the emergency.

In this context, all of that information and communication capability must be integrated into a single interface or a few interfaces. The interface with emergency services 136 is preferably an API (application programming interface) that enables third party services, such as telephone service providers, or cellular telephone service providers, to access the emergency services 140. In much the same way, the present system may rely upon such an API, represented herein by the interface with emergency services 136, to access emergency services 140 and to pass audio, video, data, location, and any other relevant information from the emergency button 120 and to emergency services 140 and, as desirable, back-and-forth between the two.

For example, audio and video will be passed to emergency services 140 directly using the interface with emergency services 136, but audio and/or video data is likewise passed back to the emergency button 120 to enable two-way communications with the user of the emergency button 120 in an emergency. Likewise, the operator may see live video from one or more cameras integrated into the emergency button 120 so that emergency services 140 can provide situational awareness to emergency services as they are in transit or before they arrive as to the nature of the emergency and who to expect meeting them at the location. In other cases, other sensors may provide still more information, available to the emergency services 140, captured by the emergency button 120 and as passed through the interface with emergency services 136.

The emergency services 140 may be or include one or more computing devices (FIG. 2) and are representative of available 911 response services, typically provided by local and state governments. Their systems are typically at large dispatch centers, also known as Public Service Answering Points (PSAPs), that handle many 911 calls at once, depending upon the size of the community. And, these operators typically have available dispatch services to emergency services like fire, police, and ambulance services. Using the interface with emergency services 136, the emergency button 120 can provide audio and video of the user, and the emergency situation that the emergency services 140 can see to provide guidance and best-direct the user to appropriate emergency service from a first responder.

The user device 150 is a computing device (FIG. 2) used by an administrator of the emergency button 120 to set it up, select services, and enable its provisioning to operate as an emergency button 120 as described herein. The user device 150 may perform many functions related to administration including, as discussed more fully herein, the ability to cancel a 911 call and the ability to eavesdrop on an ongoing emergency call and conversation involving the emergency button 120 and emergency services 140 to better understand the emergency taking place.

The network 110 is or may include the internet. The network 110 is one or more interconnection systems or protocols that enable data communication between the various computing devices described herein and in particular that are a part of the system 100.

Figure 2:
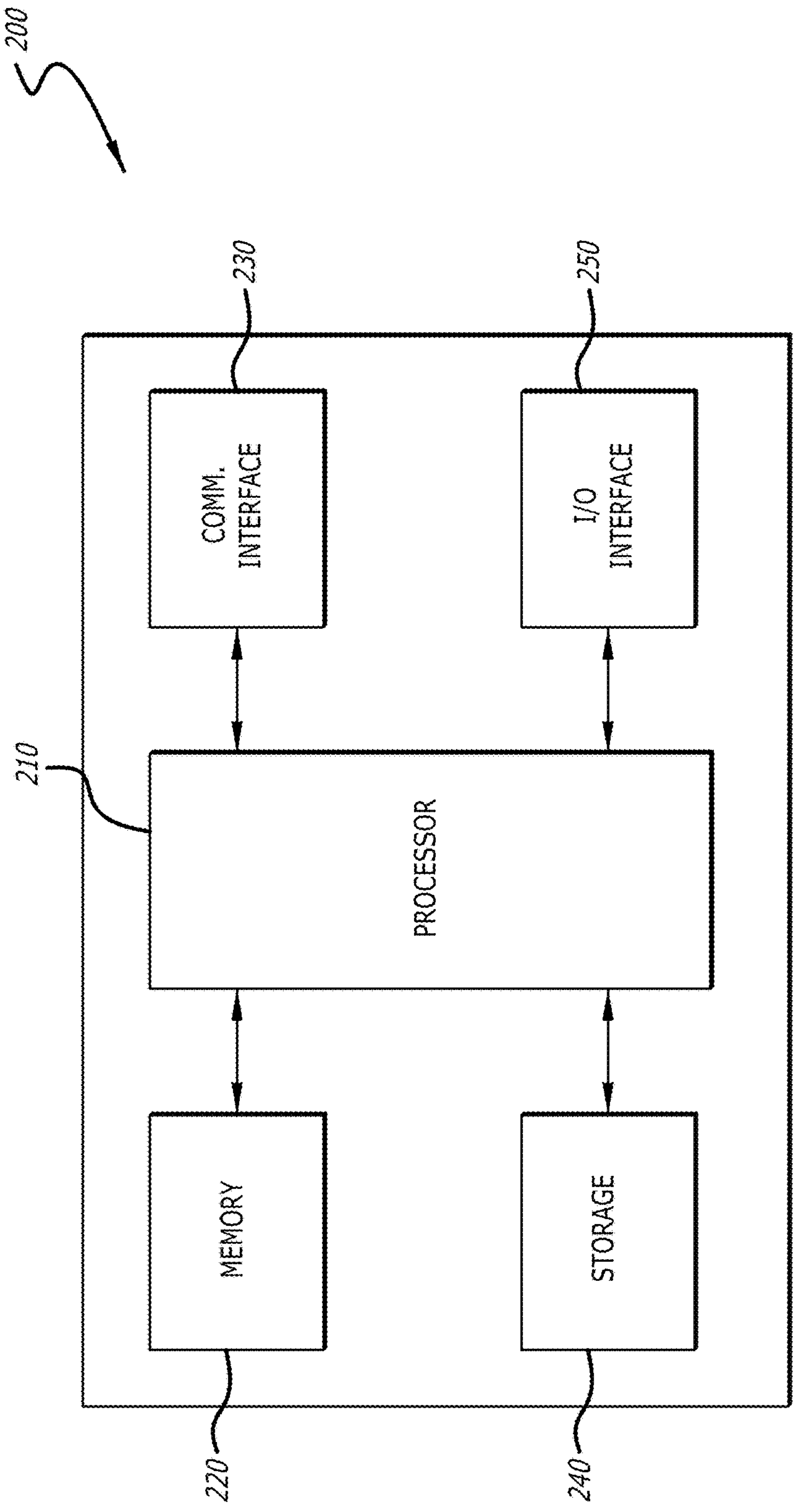
FIG. 2 is a block diagram of a computing device.

FIG. 2 is a block diagram of a computing device 200, which is representative of the camera emergency button 120, some aspects of the external services 130 (e.g., these services operate upon computing devices), some aspects of the emergency services 140, and the user device 150 in FIG. 1.

The computing device 200 may be, for example, a desktop or laptop computer, a server computer, a tablet, a smartphone or other mobile device. The computing device 200 may include software and/or hardware for providing functionality and features described herein. The computing device 200 may therefore include one or more of: logic arrays, memories, analog circuits, digital circuits, software, firmware and processors. The hardware and firmware components of the computing device 200 may include various specialized units, circuits, software and interfaces for providing the functionality and features described herein.

The computing device 200 has a processor 210 coupled to a memory 220, storage 240, a network interface 230 and an I/O interface 250. The processor 210 may be or include one or more microprocessors, specialized processors for particular functions, field programmable gate arrays (FPGAs), application specific integrated circuits (ASICs), systems on chips (SoCs), programmable logic devices (PLDs) and programmable logic arrays (PLAs).

The memory 220 may be or include RAM, ROM, DRAM, SRAM and MRAM, and may include firmware, such as static data or fixed instructions, BIOS, system functions, configuration data, and other routines used during the operation of the computing device 200 and processor 210. The memory 220 also provides a storage area for data and instructions associated with applications and data handled by the processor 210. As used herein the term "memory" corresponds to the memory 220 and explicitly excludes transitory media such as signals or waveforms.

The storage 240 provides non-volatile, bulk or long-term storage of data or instructions in the computing device 200. The storage 240 may take the form of a magnetic or solid-state disk, non-transitory ROM memory, tape, CD, DVD, or other reasonably high capacity addressable or serial storage medium. Multiple storage devices may be provided or available to the computing device 200. Some of these storage devices may be external to the computing device 200, such as network storage or cloud-based storage. As used herein, the terms "storage" and "storage medium" explicitly exclude transitory media such as signals or waveforms. In some cases, such as those involving solid state memory devices, the memory 220 and storage 240 may be a single device.

The network interface 230 includes an interface to a network such as network 150 (FIG. 1). The network interface 230 may be wired or wireless.

The I/O interface 250 interfaces the processor 210 to peripherals (not shown) such as displays, video and still cameras, microphones, keyboards and USB® devices.

Figure 3:
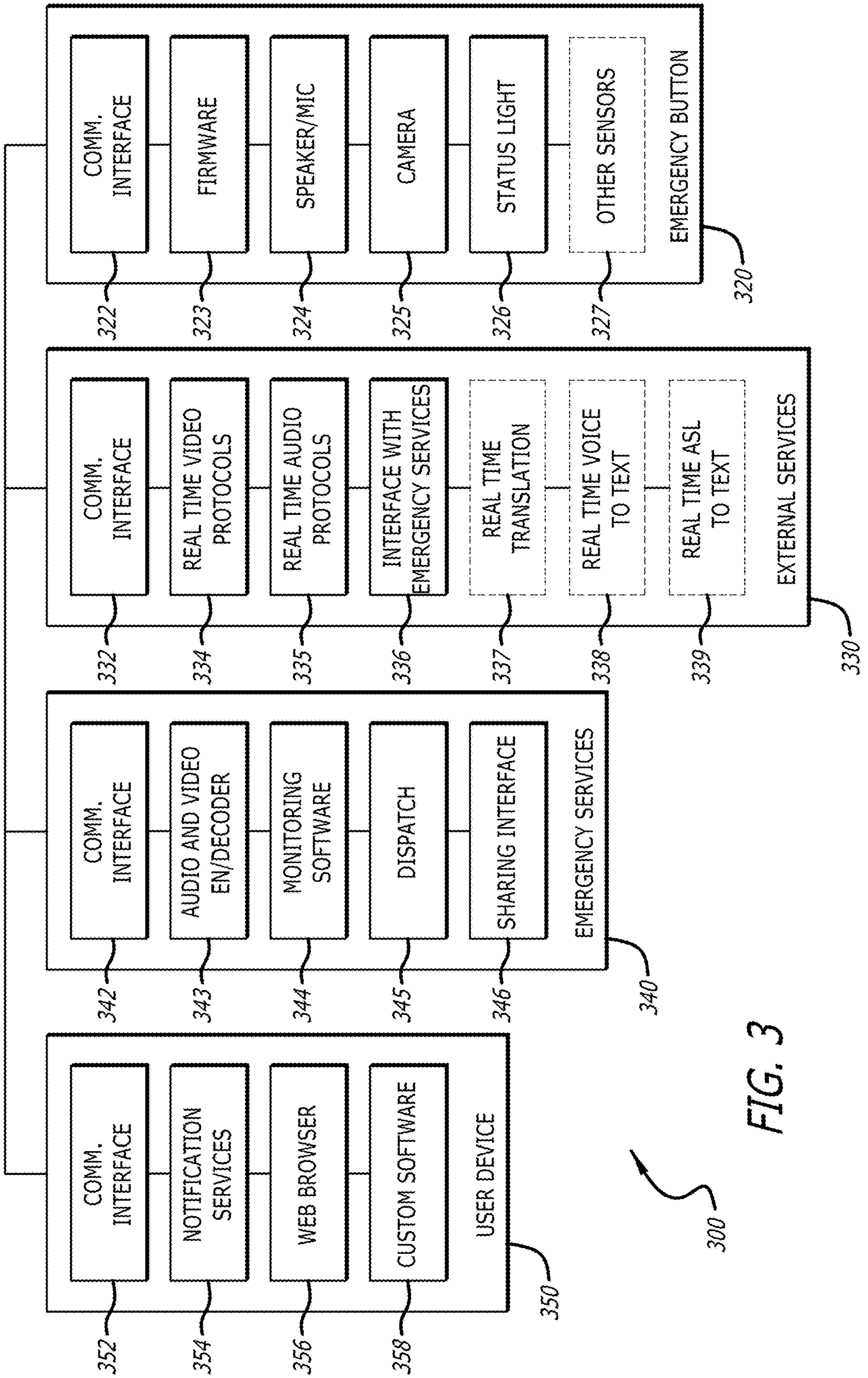
FIG. 3 is a functional, block diagram of an emergency assistance system.

Turning to FIG. 3, a functional, block diagram of an emergency assistance system 300 is shown. The system 300 includes an emergency button 320, external services 330, emergency services 340, and a user device 350. These may be the elements of the same name as described with reference to FIG. 1 above.

The emergency button 320 includes a communications interface 322, firmware 323, speaker 1170 (see FIG. 11), microphone 324, camera 325, and a status light 326, and, optionally, may include other sensors 327. The communications interface 322 is responsible for enabling communication between the components of the system 300. The communications interface 322 may include traditional networking functions such as TCP/IP communications, wireless 802.11x, ethernet functions, or cellular connectivity, but may also include custom software or software front-ends suitable for interacting with the various components of the system 300. It is preferable that cellular connectivity be provided to ensure redundancy of access to the rest of the system 300 in the event of power outages and the like. In general, the emergency button 320 will interact using the communications interface 322 with all of the other components of the system 300.

The firmware 323 is fixed software, typically burned into a ROM (read only memory) or written to an overwritable ROM that enables the emergency button 320 to perform the functions it is intended to perform. These functions are typically basic, such as operating, "booting" (the firmware is often or includes a stripped-down variant of the Linux operating system), interfacing with the components like the speaker/microphone 324, camera 325, status light 326, and other sensors 327 to enable them to perform their functions.

Suitable drivers may be included or may be a part of the firmware 323 itself. The firmware 323 is intended to be resilient, to auto boot upon unexpected power off episodes, and to generally be accessible at all times so long as power is provided. Because the emergency button 320 is intended to always be accessible, this resilience is highly desirable and/or necessary.

The speaker 1170, and the microphone 324 are separated components so as to mitigate feedback loops. A feedback loop occurs when sound from a speaker is picked up by a microphone and repeatedly re-amplified, causing an increasing squeal or tone. However, the speaker 1170 and microphone 324 may be a combined unit that interacts with the firmware 323 to enable the emergency button 320 to capture and produce audio. The speaker 1170, and microphone 324 are integrated to include suitable driver software that may be built into the speaker 1170, and microphone 324 or that may be integrated into the ROM used by the firmware 323. The speaker 1170, and microphone 324 are used by the user of the emergency button to communicate with emergency services 340.

The camera 325 is an RGB video camera that may include infrared capability as well so that it may operate in low light environments. As discussed with reference to later figures, the camera 325 may include an illumination light for illuminating dark areas, preferably an LED light, for better visibility into the area surrounding the camera 325 for the emergency services 340. The camera may include a fixed lens, or a movable lens. If the lens is fixed, it may intentionally be a wide-angle lens so as to provide as broad a view of the area near the emergency button 320 as possible.

The status light 326 is an indicator of the status of the emergency button 320 that is a visible and simple interface to enable a user to determine the status of the emergency button 320 at a glance. Various emergency button 320 statuses may be indicated by a single status light 326. The status may use blinks, solid illumination, short and long on-off sequences, and colors to communicate information regarding the status of the emergency button. For instance, a solid, on status light 326 in "green" light may indicate that the emergency button 320 is ready and available to perform emergency call functions. A steady blinking light in yellow may indicate that the device is in pairing mode. A solid red or blinking red light may indicate that the emergency button has a fatal error that prohibits it from performing an emergency call or that the battery in the emergency button 320 is low.

Other statuses that may be indicated by combinations of blinks, colors, solid, or on-off sequences of the status light 326 are low battery, no cellular or wireless connectivity, failure to communicate with eternal services 330, failure to be initialized at all (e.g., to connect to wireless or cellular networks), setup mode, lack of access to hardwired power, or not having a valid user account associated with the button and, therefore, non-functional. An entirely non-illuminated status light 326 may simply mean there are no batteries or other power available to the emergency button 320, or may mean that it has ceased to function altogether. Status may also be indicated in the user device 350, but the status light 326 enables a quick and simple check that the emergency button 320 appears to be functional and able to perform its function.

The other sensors 327 are other components integrated into the emergency button 320 to provide further situational awareness to emergency services 340 and subsequently to the emergency responders. These other sensors 327 may be or include smoke detectors, gyroscopes, humidity detectors, carbon monoxide sensors, and similar sensors that may be integrated into some or all implementations of the emergency button 320.

The external services 330 includes a communications interface 332, real time video protocols 334, real time audio protocols 335, an interface with emergency services 336, and, optionally, may include real time translation 337, real time voice to text 338, and real time sign language (ASL, BSL, LSQ, etc.) to text 339 as well. The communications interface 332 performs substantially the same functions as the communications interface 322, but on behalf of the external services 330 to enable them to interact with the emergency button 320, the emergency services 340 and the user device 350.

The real time video protocols 334 are video codecs and associated streaming protocols that allow the emergency button 320 to provide the video captured by the camera 325 to emergency services 340. Some or all of the real time video protocols 334 may be integrated into the emergency button 320 firmware 323, but at least a portion of the process of packaging the video for transmission from the emergency button 320 to the emergency service 340 may take place on external services 330.

The real time audio protocols 335 are audio codecs and associated streaming protocols to allow the emergency button 320 to provide the audio captured by the speaker 1170, and microphone 324 to emergency services 340. Some or all of the real time audio protocols 335 may be integrated into the emergency button 320 firmware 323, but at least a portion of the process of packaging the audio for transmission from the emergency button 320 to the emergency service 340 (and back in the case of audio) may take place on external services 330.

The interface with emergency services 336 is a service, typically a software-as-a-service that operates to integrate the video and audio and other sensor information created by the emergency button into a format suitable for providing to emergency services 340. The interface with emergency services 336 is a conduit through which the audio, video, and other sensor information are transmitted to the emergency services 340. In some cases, there need not be any interface 336 at all, but most local and state 911 systems operate in conjunction with third party 911 software that is purpose-designed to perform those 911 services. Utilizing a system like the interface with emergency services 336, which may be provided by those services as an API or similar interface, is typically the most effective way of gaining access to emergency services 340 while ensuring compatibility with the associated audio and video and other sensor information and data being provided by any device, including cellular phones, but also including the emergency button 320 as described herein.

The real time translation 337 is an optional function that may be integrated into the emergency button 320, but more likely is provided as a service (e.g., a SaaS service). The real time translation 337 may receive input audio from the speaker 1170, and microphone 324 and operate upon it to translate from known or detected languages into a language cognizable by emergency services 340. Using the real time translation 337 services, a user of the emergency button 320 may be able to communicate in their native language and be communicated with in their native language, all while the emergency services receives and speaks in English or Spanish or French whatever language is native to the area where the 911 services are being offered. The real time translation 337 may enable this kind of interaction and save lives when a little-known or not-local language is spoken in an emergency to a user of the emergency button 320.

The real time voice to text 338 is another optional function that enables the spoken audio to be transcribed in real time to text, and that text may be provided in transcript form to the emergency services 340 or logged for future reference in some cases. This process may be offered as a SaaS service by a third party. This may be used for a record of the conversation from the emergency button 320 or it may be used to communicate with the emergency services when the audio is not received for any reason as a secondary backup solution for providing emergency services.

The real time sign language to text 339 is another optional function that enables the external services. This may also be offered as a SaaS product from a third party. Or, it may be offered by the proprietor of the emergency button 320 itself. The camera 325 on the emergency button may be able to capture ongoing images of a user communicating in sign language (e.g. ASL or other sign languages), and may translate those in real time into text or a text transcript or a computer may audibly read (for audio) narration, to enable those who may not be able to clearly speak to still communicate with emergency services 340 using the camera 325 and the real time sign language to text 339. An external display may be integrated with the emergency button 320 such that a user in peril may view the emergency services 340 operator that may communicate in real time back to the user in sign language or alternatively provide a simplified display to instruct or cue the user that help is on the way.

External services 330 is described herein as being primarily made up of external SaaS products, but may be partially or fully integrated into the ecosystem of the emergency button operator. The functions described as taking place "external" in the external services 330 may simply be cloud-based software operating at the direction and creation of the proprietor of the emergency button 320 itself, rather than offered by third party SaaS services that are purchased by that proprietor.

The emergency services 340 include a communications interface 342, audio and video encoder/decoder 343, monitoring software 344, dispatch 345, and a sharing interface 346. The communications interface 342 performs substantially the same functions as the communications interfaces 322 332, but on behalf of the emergency services 340 to enable them to interact with the emergency button 320, the external services 330 and the user device 350.

The audio and video encoder/decoder 343 is software that enables two way communication between emergency services 340 and a user via with the speaker 1170, and microphone 324 within the emergency button 320. The audio and video encoder/decoder 343 translates captured audio and video from the emergency button 320 to emergency services 340 operators into a format suitable for transmission. The audio and video stream received by emergency services 340 is then decoded by the audio and video encoder/decoder 343 so that it may be viewed on monitoring software 344. Likewise, audio and video encoder/decoder 343 translates captured audio from emergency services 340 operators to the emergency button wherein the audio stream received by the emergency button 320 is decoded for playback by the emergency button 320.

The monitoring software 344 is custom software designed for emergency services 340 operators to enable them to hear and see emergency calls, as well as enabling them to generate transcripts of calls, and to communicate with emergency callers and users of the emergency button 320. It is the intent that the emergency assistance system 300 described herein should enable the emergency button 320 to integrate with existing monitoring software 344 in precisely the same fashion as a typical cellular device calling. The monitoring software 344 is relatively standardized, with a few major providers offering 911 monitoring software used by most U.S. jurisdictions.

The dispatch 345 is a software and/or hardware system used by first responders to access dispatch. In most 911 systems, this is a specialized service with access to police radio bands, the computing devices—also referred to as mobile data terminals—already resident in most patrol cars, fire dispatch systems, and ambulance dispatch systems. These various systems are typically integrated in 911 emergency services 340 into one unified system called herein dispatch 345. Because the system 300 does not utilize intermediaries to communicate with 911 emergency services 340, but interfaces directly with 911 services just as a mobile phone would do, the emergency services 340 has access to dispatch 345 directly.

The sharing interface 346 is software and/or hardware that enables the emergency services to share the received content from the emergency button 320. This sharing may be to the user device 350, to emergency first responders (e.g. computing devices in police units, iPads or other devices operated by first responders, etc.). The sharing interface 346 may enable first responders and/or a user of the user device 350 to see and access the camera 325 and audio produced by the speaker 1170, and microphone 324 and/or monitoring software 344 for situational awareness and to enable users to, for example, see and hear the emergency taking place in their home or the other place the emergency button 320 has been placed. Sharing using the sharing interface 346 may be intentionally limited to only first responders and the user registered to the emergency button's user device 350 to avoid inadvertently or bad actors intentionally sharing video or audio of emergency calls without proper authorization.

The user device 350 includes a communications interface 352, notification services 354, a web browser 356, and custom software 358. The communications interface 352 performs substantially the same functions as the communications interfaces 322, 332, 342, but on behalf of the user device 330 to enable it to interact with the emergency button 320, the external services 330, and the emergency services 340.

The notification services 354 is a part of the operating system of the user device 350 that may be used to notify the user of the user device 350 of emergency events, button presses, the availability of audio and/or video of the emergency. The notification services may be used, for example, to notify a user that the emergency button 320 associated with that user has been activated at their residence (or other location) and offer them the opportunity to decline the emergency or to move forward with contacting emergency services 340. In some cases, such an opportunity may not be provided at all. And, if one is provided, live video and audio may be provided from the camera 325 and the speaker 1170, and microphone 324 to enable the user to make a better determination if the activation was in error or a real emergency exists.

The web browser 356 is software operating on the user device 350—which may be a mobile device like a smart phone but may also be a laptop, desktop, tablet or other computer—that enables browsing websites. A web-based application may be provided with access to some functions of the emergency button 320 such as setup, user accounts, authorized users who can change settings, information about those present at the location where the emergency button 320 is installed (e.g., there are children with the names Margot and William at the home, ages 5 and 6). In addition, the web-based software may be accessible to the web browser 356 to enable streaming of audio and/or video from the emergency button when it has been activated without the installation or need to rely upon custom software 358.

The custom software 358 is software made by the proprietor of the emergency button 320, or otherwise made at their direction, to enable access to functions like administrative functions, setup of the emergency button 320, and to provide the ability to stream an emergency call initiated from the emergency button 320 as well as potentially offering the ability to cancel a call for a few seconds (5 to 30 seconds) after the emergency button 320 is activated, but before the call is placed, connecting the emergency button 320 to the emergency services 340. This capability may be a setting set using the web browser 356 or the custom software 358 to, for example, provide parents with more granular control over children inadvertently pressing the emergency button 320 when emergencies are not present.

Figure 4:
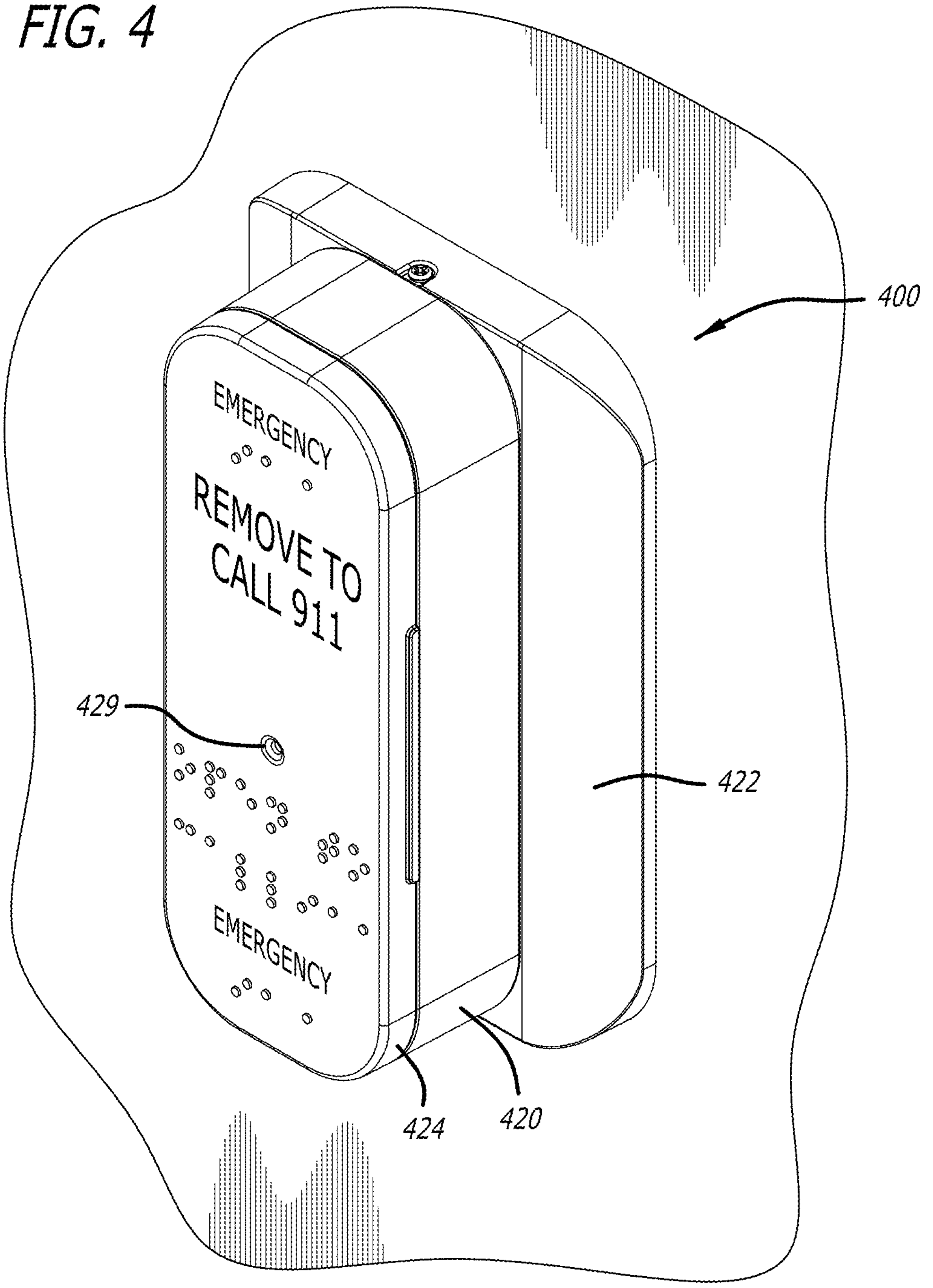
FIG. 4 is a front, perspective view of an emergency device for an emergency assistance system.

FIG. 4 is a front, perspective view of an emergency device 400 for an emergency assistance system. The emergency device 400 includes an emergency device body 420 which houses and encloses the electronic components and provides a rigid structure for mounting and activation of the emergency button.

A mounting plate 422 is provided for mounting the emergency device body 420 to a wall, door, or other location.

A cover 424 is also shown, entirely covering the face of the emergency device body 420. The cover 424 includes an aperture 429 through which a status light (not shown, see FIG. 5) may be seen. The cover includes text clearly indicating that the device is intended to be used to enable users to contact emergency services. As shown in FIG. 4 the text includes two indications of the word "EMERGENCY" and the text "REMOVE TO CALL 911." Other indications may also be used in place of these. The device is preferably a white or near-white color, with the counterpart text in high contrast to the white or near-white color of the device so that it may readily be seen and read from a distance. Alternative high contract color configurations for the device and counterpart text may be implemented. In addition, Braille script may be present on the exterior of the cover 424 to enable sight impaired users to determine the device's purpose without reading the written letters.

Notably, the cover 424 is rigid, and is preferably only loosely fixed to the emergency device body 420, for example using magnets. In this way, the cover 424 both ensures that there can be no inadvertent activation of the emergency device 400 while the cover is in place over the emergency button (not shown, see FIG. 5), but also that removal of the cover 424 in an emergency is quite easy to do, even for small hands, or someone who has been injured. The cover 424 is configured to be operable with one hand, requiring no more than five pounds of activation force, to be actuated without tight grasping, pinching, or wrist twisting. Ridges or other grip aids may be provided on one or more edges surrounding the cover 424 to provide portions of the cover 424 that may be easily gripped by a user.

Figure 5:
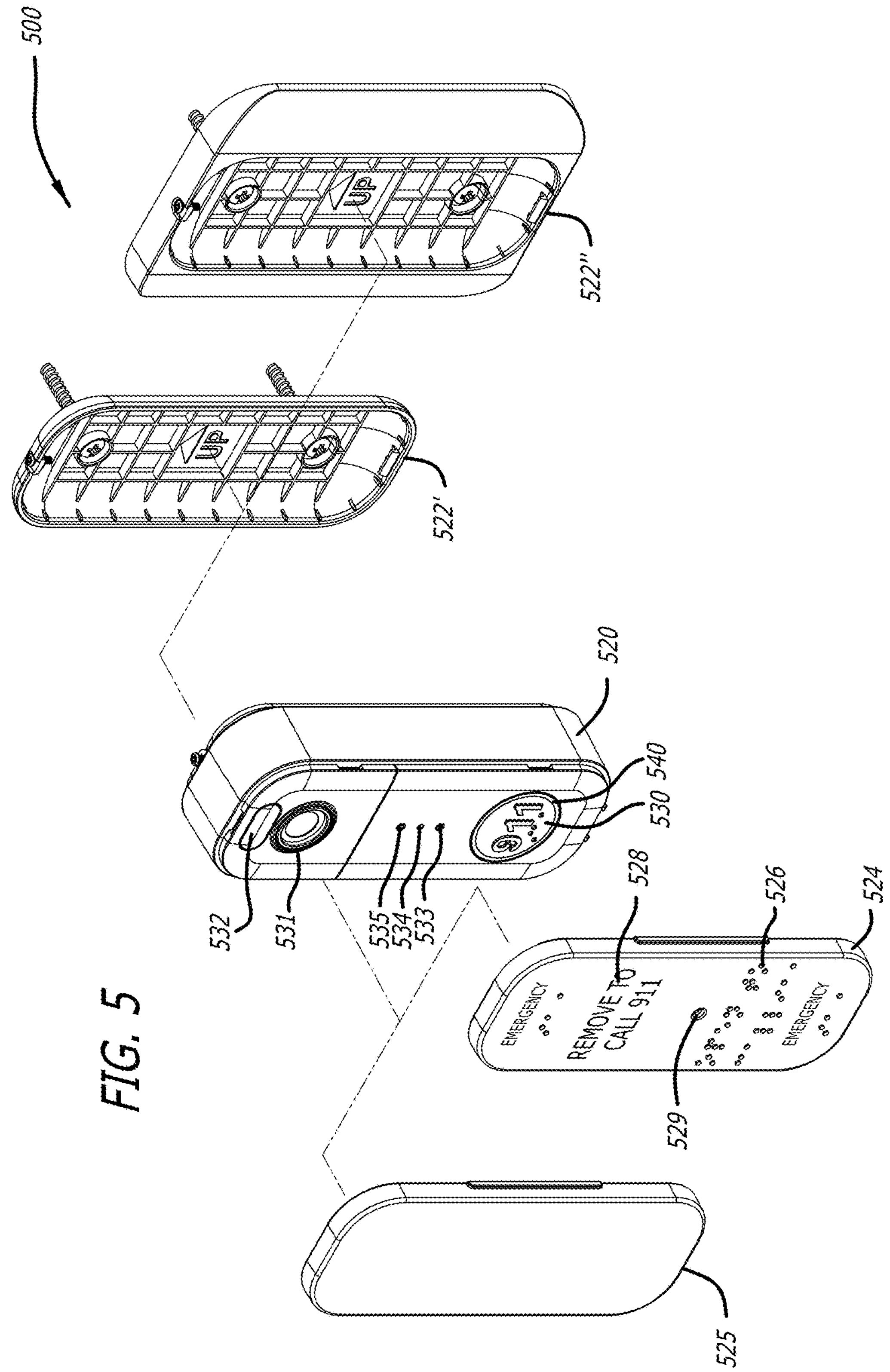
FIG. 5 is a front, partially-exploded, perspective view of an emergency device, mounting plates, and two covers for an emergency assistance system.

Turning now to FIG. 5, a front, partially-exploded, perspective view of an emergency device 500, mounting plates 522', 522", and two covers 524, 525 for an emergency assistance system is shown. The emergency device 500 mounting plates 522' and 522" are wider and narrower, respectively, for different mounting situations. The wider mounting plate 522" may provide better security on a wall or other mount location while the narrower mounting plate 522' may provide a cleaner, more aesthetic appearance, and enable the emergency device 500 to be mounted in locations where the wider mounting plate 522" will not fit. In certain embodiments, an insulative foam material, or alternatively any other suitable resilient or compliant material, may be incorporated into or coupled with the mounting plates 522' and 522" to facilitate proper seating, alignment, and retention of the emergency device 500 within the mounting plates 522' and 522" during installation and use.

The emergency device body 520 is now shown with the cover 524 removed. The emergency button 530, the camera 531, illumination light 532, microphone 533, status light 534, and speaker 535 are all visible on the face of the emergency device body 520. The purposes of these components are generally discussed above with reference to FIG. 3. A few aspects will be highlighted again here.

The emergency button 530 is the most important component of the device 500. Activation of the emergency button 530 causes emergency services to be contacted, using the emergency device 500 effectively as a telephony device. Preferably, there is no intermediary monitoring service, no alarm company, and no other party screening or otherwise delaying access to government-sponsored emergency services that traditionally have been available to dialers of 911 using landlines and mobile phones.

The emergency button 530 is labelled "911" to indicate that pressing the button is a call for emergency assistance, and to use the well-known understanding of 911 services as calling for immediate, urgent help. The 911 numerals may be formed as translucent indicia and illuminated by one or more opposingly positioned light emitting diodes (LEDs) (see FIG. 7). Alternatively, the 911 numerals may be raised and pad-printed in white or another high-contrast color to enhance visibility. The emergency button 530 may also have a translucent ring 540 that circumferentially surrounds the button and may be backlit by opposing LEDs (not shown, see FIG. 7) to generate a halo illumination effect around the emergency button 530. The translucent ring 540 may be formed as an aperture defined around a structural support portion of the emergency button 530, and/or may comprise a window pane or insert formed from a translucent material positioned adjacent the emergency button 530 to permit transmission of light therethrough. Braille lettering may also be provided on the button itself for individuals with sight impairment to be better able to recognize the purpose of the button and locate it on the face of the emergency device body 520.

The camera 531 may capture RGB and infrared still and moving images, as directed by associated firmware, and those images may be provided to emergency services throughout an emergency call initiated by the emergency device 500. In dark environments, the illumination light 532 may be activated automatically to better see the caller and/or emergency environment.

The microphone 533 and speaker 535 are used to communicate audibly with emergency services and to hear responses from emergency services.

The status light 534 is discussed above, but importantly it is on the face of the emergency device body 520, visible when the cover 524 is removed, and also visible through an aperture 529 in the cover 524 when the cover 524 is in place. In this way, the status of the emergency device 500 may always be ascertained with a quick glance, rather than having to check a mobile application, remove the cover, or closely inspect the emergency device 500.

The cover 524, the emergency identification labels 528, and the Braille lettering 526 provide indication to sighted and sight impaired individuals about the purpose of the emergency device 500 when in place as discussed above. The cover is preferably held in place loosely with magnets so that the emergency button 530 may be accessed easily in an emergency situation.

The out-of-service cover 525 is intended to be placed over the face of the emergency device 500 in cases in which the emergency device 500 is not available for use. It is intentionally unlabeled, plain, and nondescript to avoid confusing individuals into thinking that the emergency device 500 is available or will work, wasting valuable time in an emergency situation. The out-of-service cover 525 may be labeled with "out of service" lettering or may simply be blank, as shown. In addition, no status light 534 may be seen through the out-of-service cover 525 because the status is always out-of-service.

Further, the out-of-service cover 525 is preferably more securely fixed to the face of the emergency device body 520 so that it may not easily be removed. This further reinforces that the emergency device 500 is out-of-service and an individual in an emergency should look elsewhere for assistance. The out-of-service cover 525 may be fixed using mechanical clips. Screws, clips requiring the use of multi-purpose or specialized disengagement tools, latches, grommets, and other fixing methods may be used as well or instead to affix the out-of-service cover 525 to the emergency device body 520. As needed, counterpart elements may be incorporated into the exterior of the emergency device body 520.

Figure 6:
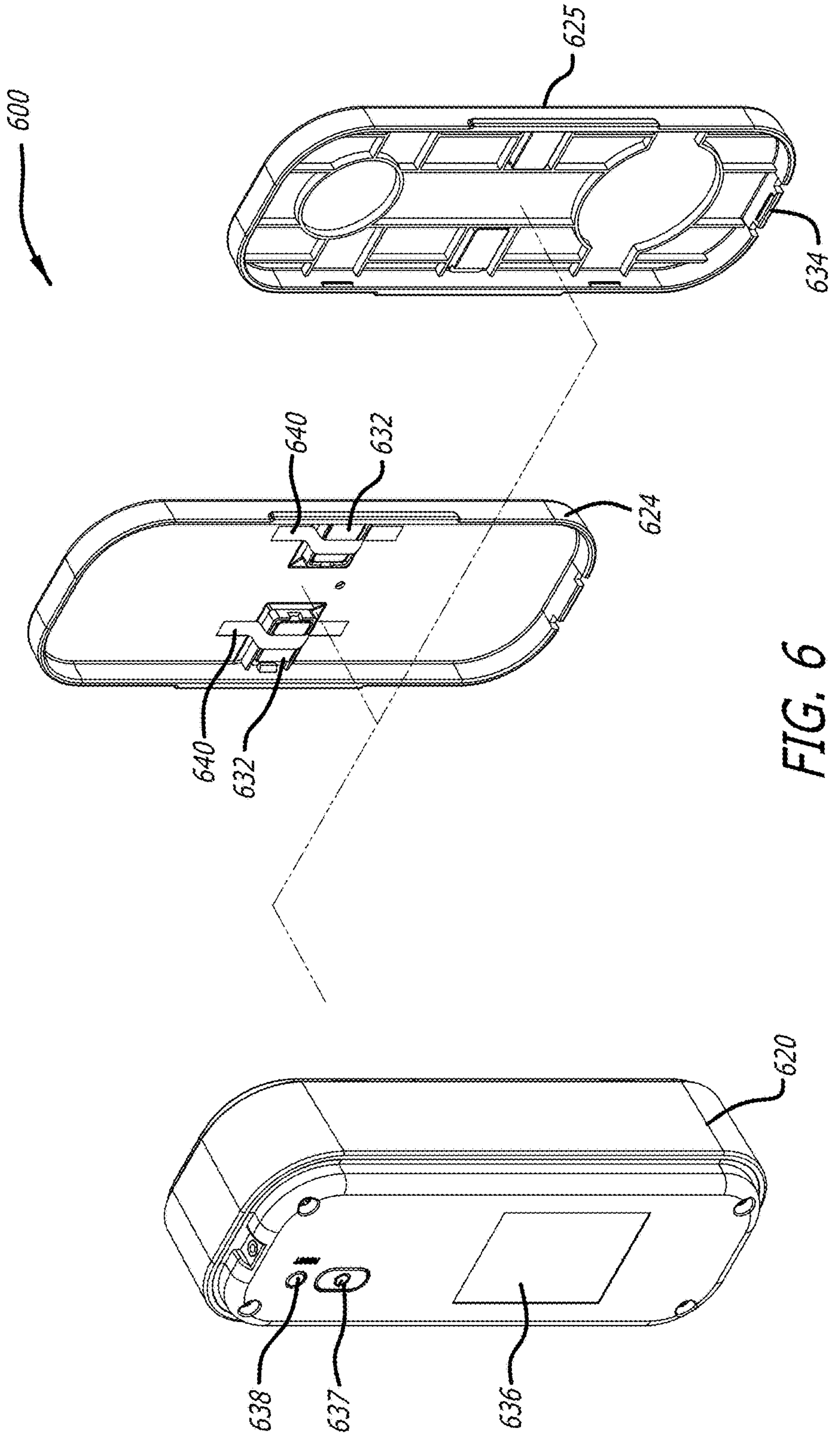
FIG. 6 is a rear perspective view of an emergency device and two covers for an emergency assistance system.

FIG. 6 is a rear perspective view of an emergency device 600 and two covers 624, 625 for an emergency assistance system. The emergency device body 620 back may be seen with a replaceable battery cover 636, a power switch 637, and a reset switch 638. The reset switch 638 is recessed to avoid inadvertent resetting. Activation of the reset switch 638 will reset the emergency device 600 to default settings allowing it to be setup again as if it were a new device. It is located on the back of the emergency device 600 and recessed to avoid inadvertent activation.

The cover 624 back integrates the two magnets 632 that are used to loosely secure the cover 624 to the face of the emergency device body 620. Two counterpart magnets arranged with opposite poles facing the two magnets 632 may be disposed within the emergency device body 620 (not visible) to enable the cover 624 to remain fixed in place over the face of the emergency device body 620, but to allow for easy removal by users in an emergency or with small hands. In some embodiments an adhesive 640 may be applied to the two magnets 632 or the counterpart magnets for added securement of the cover 624 while maintaining the semi-ease of removal. Additional fasteners are contemplated that allow for removable securement of the cover 624. For example, an adhesive sticker may be placed over the two magnets 632. Or, one or more metal plates may be disposed opposite the two magnets 632 within the emergency device body 620. Fewer or more magnets 632 may be used in some cases. In still other cases, the two magnets 632 may be replaced with one or more metal plates, and one or more magnets may be disposed within the emergency device body 620.

The out-of-service cover 625 includes no magnets or metal plates. It preferably uses clips or other more-permanent fixing means, like clip 634, to maintain its position over the emergency device body 620 face. As discussed above, the out-of-service cover 625 is intended to be more difficult to remove, and nondescript to dissuade engagement with the emergency device 600 in an emergency when the device is out-of-service.

Figure 7:
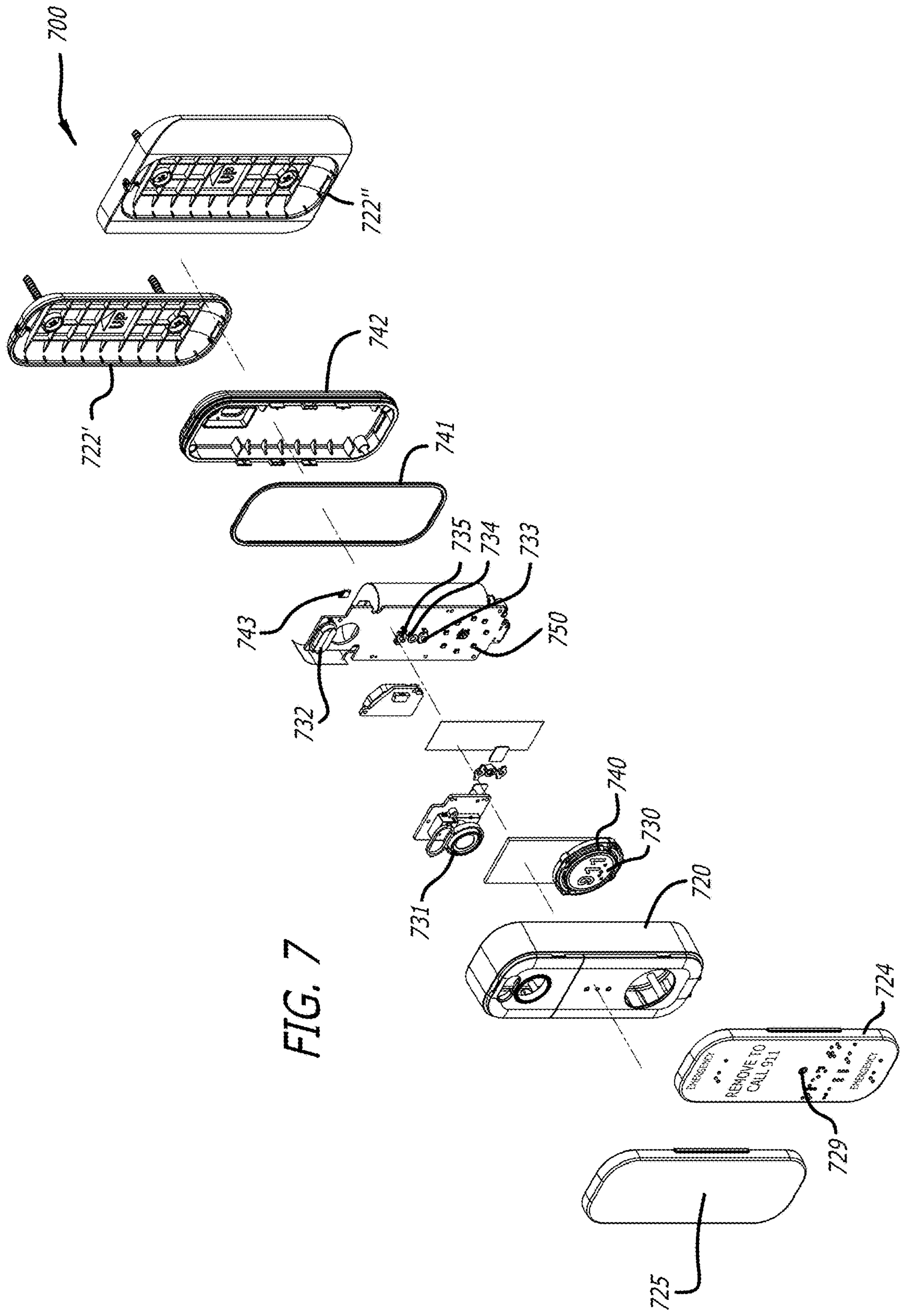
FIG. 7 is a perspective, exploded view of an emergency device, mounting plates, internal components, and two covers for an emergency assistance system.

FIG. 7 is a perspective, exploded view of an emergency device 700, mounting plates 722', 722", internal components, and two covers 724, 725 for an emergency assistance system. Most of the components present in FIG. 7 have been discussed above. Those discussions will not be repeated here. There also are visible the emergency device body 720, now with the emergency button 730 and its printable circuit board (PCB) on which it is mounted visible. Likewise, the camera 731 and its PCB are visible. The illumination light 732 is visible on a primary PCB also including the microphone 733, status light 734, speaker 735, and a plurality of LEDs 750. The plurality of LEDs 750 are arranged on the PCB in a circular configuration to illuminate the surrounding area and/or a translucent ring 740 to provide a highlighting effect, such as a halo illumination around the emergency button 730. The plurality of LEDs 750 may be positioned at various locations on the PCB to achieve a desired illumination effect, and are not limited to a circumferential arrangement about the emergency button 730 or translucent ring 740.

A battery pack 743 backs the primary PCB. Though the preferred emergency device 700 is powered by a battery pack 743, which may be rechargeable, for example, using a USB-C plug disposed in the base of the primary PCB, it is likewise possible that the emergency device 700 is hard-wired, with power always available, instead or in addition to the battery pack 743. The emergency device 700 may be plugged into a typical electrical socket and either cover all or a portion of that socket, or be joined by a cable to a location where it is mounted on a wall or other surface.

A seal 741 joins the emergency device body 720 to the emergency device back plate 742. Clips may retain the emergency device body 720 to the back plate 742 with the seal 741 held in place by frictional engagement, thereby forming a seal substantially impermeable to dust.

The aperture 729 is still visible on cover 724, and no markings are present on out-of-service cover 725.

Figure 8:
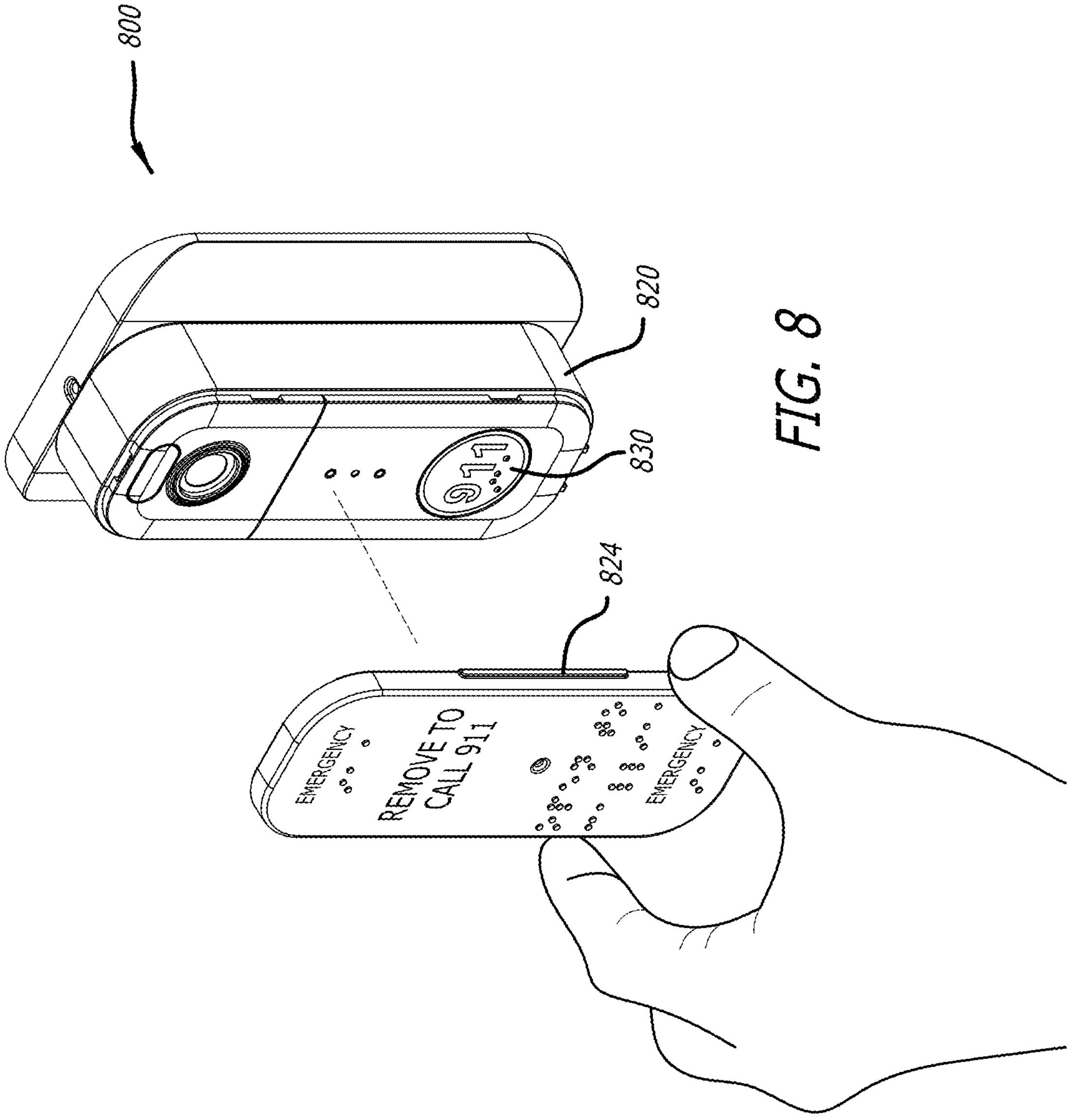
FIG. 8 is a perspective view showing attachment of a cover to an emergency device.

FIG. 8 is a perspective view showing removal of a cover 824 to an emergency device 800. The cover 824 is in the process of being removed from the emergency button 830 and the face of the emergency device body 820. As indicated above, the cover 824 may remain held in place weakly by, for example, one or more magnets and counterpart magnets or metal plates capable of magnetic attraction, each within one of the cover 824 and the emergency device body 820.

Notably, the rigid body of the cover 824 prevents activation of the emergency button 830 when the cover is in place. The plane of the emergency device body 824 face may be slightly-raised relative to the face of the emergency button 830. Thereby, when the cover is in place 824, and given its rigid body, even strong presses against the exterior of the cover 824 will not result in activation of the emergency button 830. Instead, the force will be spread across the slightly-raised face of the emergency device body 820.

Figure 9:
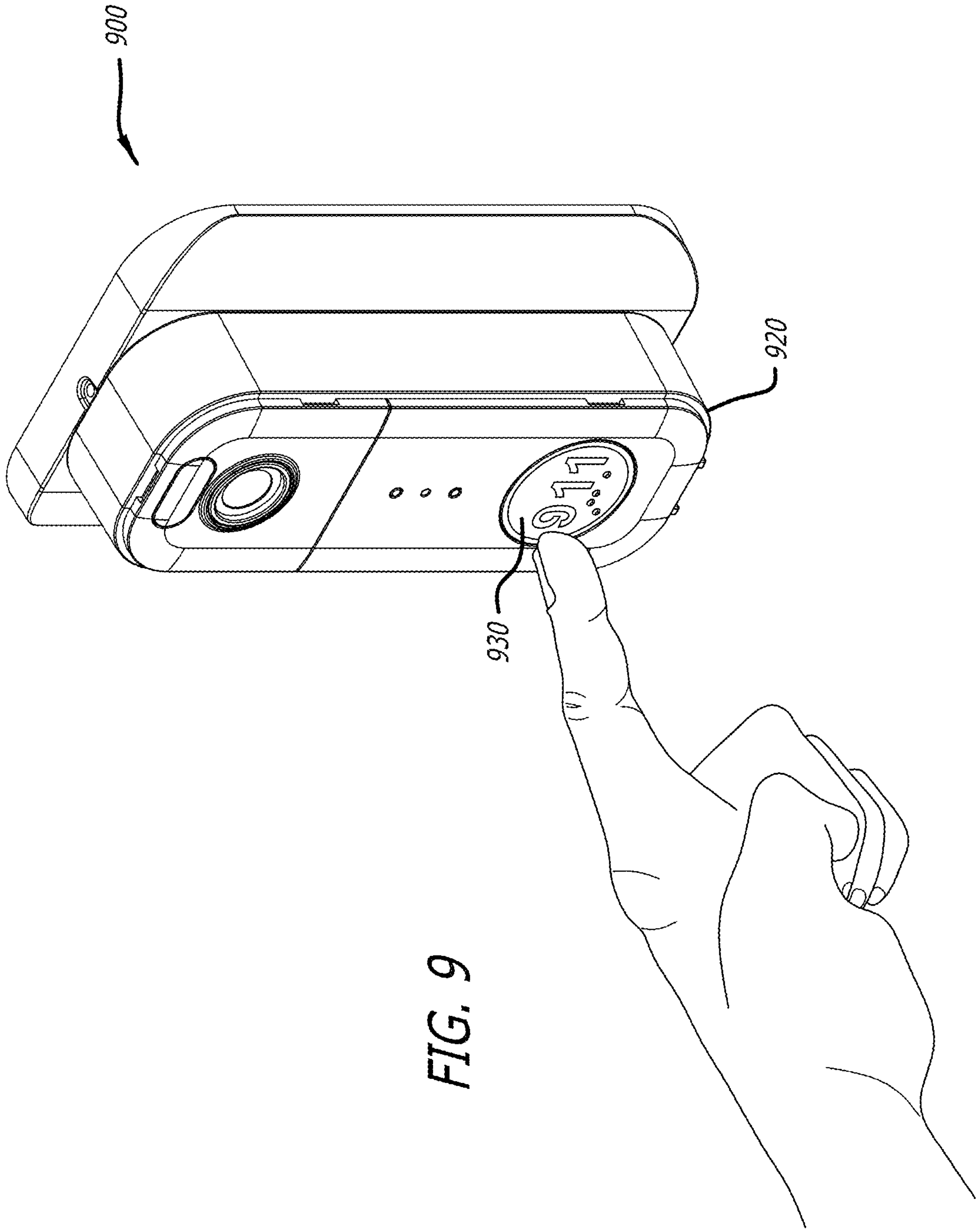
FIG. 9 is a perspective view of an emergency device in the process of being activated.

FIG. 9 is a perspective view of an emergency device 900 in the process of being activated. The user may activate the emergency device button 930 simply by depressing the button 930. Doing so will prompt the emergency device 900 to call emergency services. In some cases, a slight delay may be imposed to enable a user, e.g., a user of a remote device like a mobile device, to cancel the call to emergency services. Notably, in a preferred case, the emergency device 900 is not monitored by a third party service such as an alarm company or similar company. Instead, the emergency device 900 actually dials 9-1-1 using cellular (or 802.11x or similar wireless) technology and initiates the call with emergency services capable of requesting dispatch of police, fire, or ambulance services. The intent is to enable functionality much like that available directly from a phone in early incarnations of the 911 system.

Figure 10:
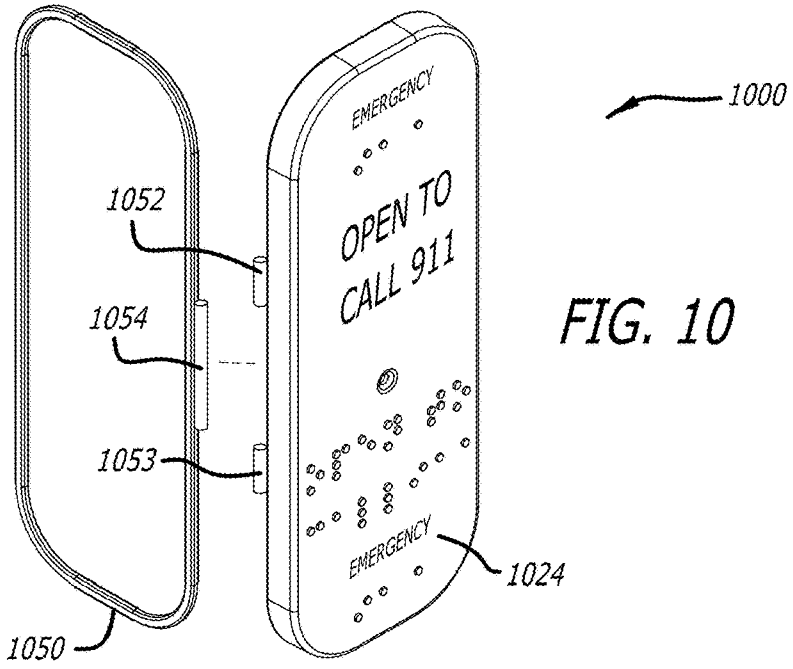
FIG. 10 is a cover for an emergency device incorporating a hinge.

FIG. 10 is a cover 1024 for an emergency device 1000 incorporating a hinge. This cover 1024 is of a different configuration where the cover is not simply entirely removed before activating the emergency button (not shown). Instead, a back plate 1050 is affixed to the emergency device body, preferably using the same more-permanent clips or similar attachment methods that are described above with respect to the out-of-service cover (FIGS. 5 & 6). The back plate 1050 and cover 1024 incorporate a hinge made up of two cover hinge elements 1052, 1053 and a back plate hinge element 1054 joined by a pin (not shown) to enable the cover 1024 to hingedly pivot away from the face of the emergency device body (not shown) but remain affixed to the emergency device body. In this way, the emergency device cover 1024 is less-likely to be lost or misplaced. The emergency button (not shown) is still covered, and access remains easy, and it is less likely that the cover 1024 may go missing after it is temporarily removed inadvertently or in an emergency. In an alternative embodiments the cover 1024 may also integrate a viewing window (not shown) arranged coaxially with the camera (not shown) on the opposite side thereof allowing the camera to be activated for remote monitoring by an administrator of the emergency button 120 while the emergency button 120 remains un-activated. The window may be formed from a transparent or substantially transparent material, such as polycarbonate, acrylic (PMMA), tempered glass, chemically strengthened glass, sapphire, or other optically transmissive polymer or ceramic material, and may be configured to provide impact resistance, scratch resistance, and environmental sealing.

Figure 11:
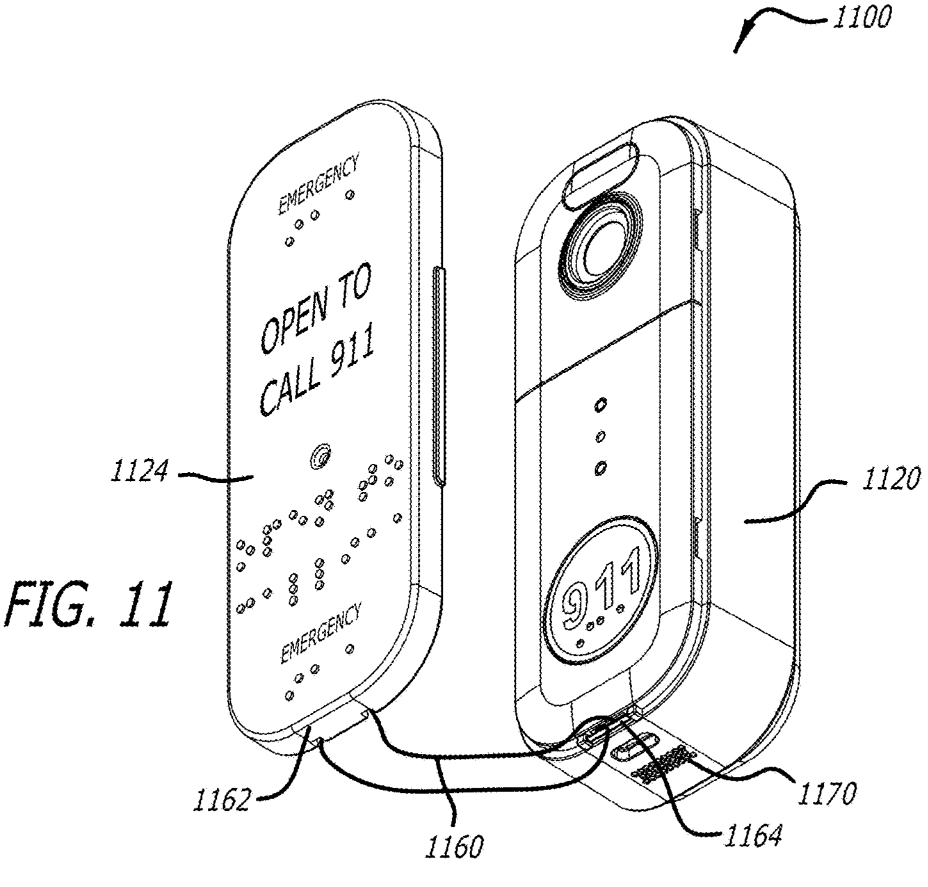
FIG. 11 is a cover for an emergency device incorporating a tether.

FIG. 11 is a cover for an emergency device 1100 incorporating a tether 1160. The cover 1124 is joined to the emergency device body 1120 by a tether 1160. The tether 1160 may be made of cloth, plastic, woven, chain, or the like. At the cover 1124 and the emergency device body 1120, the tether 1160 may be joined to each by a pass-through loop formed in the material, by the tether 1160 being injection molded into one or both of the cover 1124 or the emergency device body 1120, or may be manufactured incorporating suitable clip, harness, or similar attachment systems.

The purpose of the tether is to ensure that the cover 1124 remains near the emergency device 1100 even when it is removed from the emergency device body 1120, either inadvertently or to use the emergency button (not labeled) in an emergency. Without the tether 1160, the cover 1124 may be lost or otherwise go missing. In such a case, the emergency button would no longer be protected from inadvertent activation, and the labelling of the device as an emergency device, both in text and Braille would be less-visible. Accordingly, a tether 1160 may serve to keep the cover 1124 joined to the emergency device housing 1120.

Although shown implemented in a personal computer, the processes and apparatus may be implemented with any computing device. A computing device as used herein refers to any device with a processor, memory and a storage device that may execute instructions including, but not limited to, personal computers, server computers, computing tablets, set top boxes, video game systems, personal video recorders, telephones, personal digital assistants (PDAs), portable computers, and laptop computers. These computing devices may run an operating system, including, for example, variations of the Linux, Microsoft Windows, Symbian, and Apple Mac operating systems.

The techniques may be implemented with machine readable storage media in a storage device included with or otherwise coupled or attached to a computing device. That is, the software may be stored in electronic, machine readable media. These storage media include, for example, magnetic media such as hard disks, optical media such as compact disks (CD-ROM and CD-RW) and digital versatile disks (DVD and DVD±RW); flash memory cards; and other storage media. As used herein, a storage device is a device that allows for reading and/or writing to a storage medium. Storage medium, as used herein, expressly excludes transitory media and propagating waveforms. Storage devices include hard disk drives, DVD drives, flash memory devices, and others.

Description of Processes

Figure 12:
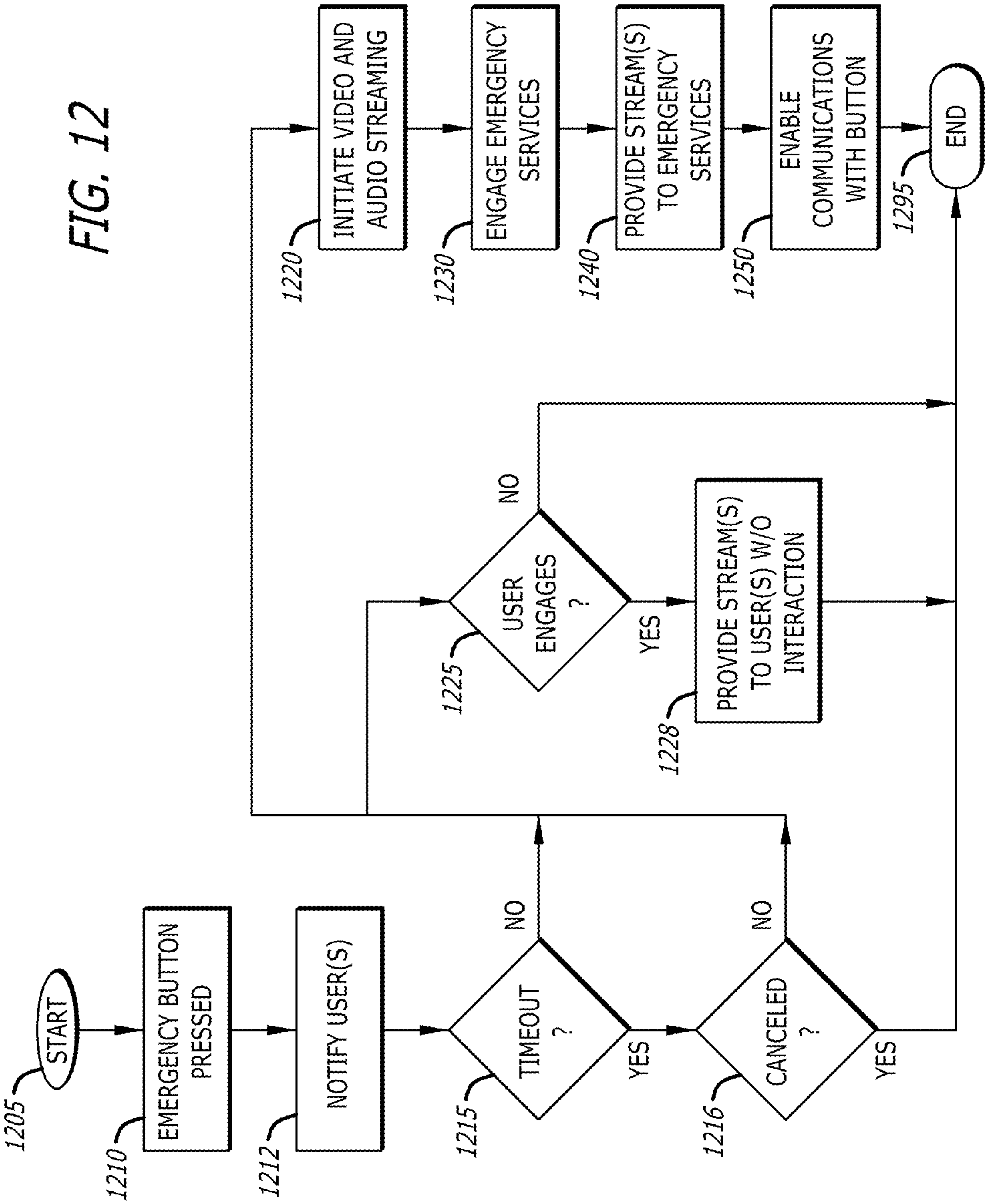
FIG. 12 is a flowchart of a process of use of an emergency assistance system.

Referring now to FIG. 12, a flowchart of a process of use of an emergency assistance system is shown. The process has a start 1205 and an end 1295, but may take place many times over the course of the operation of an emergency assistance system.

Following the start 1205, the system waits until the emergency button is pressed at 1210. In this waiting time following an initial device setup, which may be many weeks, months, or years; the emergency system simply continues to maintain a connection to remote services so that it may be accessible in time of need and, as needed, reports its status using the status light to provide feedback to individuals within line of sight that the device is functional (or not) and ready to be used in an emergency.

After the emergency button is pressed—indicating that there is an emergency in the vicinity of the button—users may be notified at 1212. This step may be optional in some cases, and may not be present. Or, the presence of this step may be a setting set by a user or administrator who wishes to have the opportunity to cancel or otherwise review an emergency call before it goes to emergency services. Similarly, an optional timeout 1215 step may be present for such a request that may be set by an administrator to five seconds, ten seconds, thirty seconds, a minute or longer, or deactivated as desired. This can appear as a popup on a user device 350 (FIG. 3) that enables the user to open an application and cancel the request or approve the request, thereby sending the request to emergency services. Alternatively, the popup itself may enable a user to cancel or approve without opening an app to speed the user's ability to approve or refuse. Again, the intent of this setting, where present, is to avoid inadvertent or unnecessary calls being placed to emergency services. This is an improvement over the state of the art because, for example, a child can press the button with minimal prior instruction and the default is to proceed to an emergency services call. The user's device may remain locked or inaccessible and the call will still proceed. However, if the call was inadvertently made and the parent is aware and the popup appears, it may be cancelled before emergency services is called through intentional, direct action.

If the timeout 1215 is activated ("yes" at 1215), then the process continues to determine if cancellation is desired at 1216.

If the timeout 1215 is deactivated ("no" at 1215), then the process continues with a substantially simultaneous user engagement determination at 1225 and initiation of video and audio streaming at 1220.

If the call is cancelled ("yes" at 1216), then the process ends at end 1295. It may start again at 1210, if the emergency button is pressed, but this activation is terminated.

If the call is not cancelled ("no" at 1216), then the process continues with a substantially simultaneous user engagement determination at 1225 and initiation of video and audio streaming at 1220.

If the user engages ("yes" at 1225), then any video and/or audio streams that are created by the emergency button and emergency services are likewise provided to those users. So, here, for example, a parent or guardian may receive a notification that the emergency button has been activated at 1212. That parent may approve or not-cancel the emergency button activation, and in that process may be presented with some audio and/or video from the emergency button's vicinity in order to make that decision. Thereafter, at 1225, the user may be presented (e.g., on that user's mobile device) with the opportunity to engage with the emergency call. That is, the user may wish to follow along with the call to understand what is happening. If so ("yes" at 1225), then the streams created by the emergency button and the emergency services (e.g., the audio responses to statements and questions from the user of the emergency button) may be provided to the user on the mobile device to listen in and watch, so as to understand the emergency 1228.

Notably, the user is not provided with the opportunity to interject or otherwise interact with the audio and/or video. The intent is to enable the emergency services to carry out its processes without confusion and interruption from multiple callers and individuals engaging. In some cases, the user may be able to text or otherwise communicate with the emergency services, but the preference is to retain the integrity of the call with the emergency button itself and not add further confusion. Still, the user (typically a parent or relative of the activator of the emergency button) will be interested to know what is happening and streaming to an additional device, like the user device 350 (FIG. 3) requires virtually no additional overhead or cost. Accordingly, the user may better understand the nature of the emergency as they are in the process of travelling to or moving toward their home or other location where the emergency button is mounted.

In a similar fashion, this stream may be provided to first responders. So, for example, in the case of a fire emergency, the fire department may be provided by emergency services (or other system) access to the streams of audio and video to better understand the situation when they arrive. In the unfortunate case of in-school violence or some other, similar event, police officers and other first responders may have situational awareness provided by the streams from one or more emergency buttons present in one or more locations within the location in a similar fashion. Again, the intent is to not enable those individuals to interrupt an ongoing emergency call, but to see what is happening so that they can better prepare and strategize for safety, to render medical aid, or to better fight the fire and/or rescue trapped individuals or individuals in danger. Moreover, first responders may communicate directly with the individuals. For example, a first responder enroute may takeover for the dispatcher and provide guidance to the individual as needed (e.g. cpr guidance). In this way the dispatcher can move on to another call while maintaining the open line of communication with the individual who is now speaking with the first responder. This eliminates the second hand conveyance of information and multiple communication mediums, which typically follows information relayed from a victim to dispatcher via a phone, dispatcher to responders via radio, responders back to dispatcher via radio, then dispatchers back to the victim via phone. The elimination of multiple forms of communication increases efficiency and may aid in preserving an individuals life during an emergency where time is of the essence.

Substantially simultaneously, video and audio streaming are initiated for the emergency services and user of the emergency button at 1220. Here, the external services 340 (FIG. 3) are activated, and the communication for the emergency response is initiated. For the user of the emergency button 320 (FIG. 3), audio and video from the emergency button will be made available, encoded appropriately for emergency services and, in response for the emergency button.

Thereafter, emergency services 340 are engaged to assist the user of the emergency button 320 at 1230. This includes audio and video communication, but also dispatch of appropriate emergency services responders.

In that process, the stream(s) are provided to emergency services and the user of the emergency button at 1240. The stream(s) are provided to emergency services and, if selected, to the user (at 1228) or first responders, as described above. For the emergency services, the audio and video appear and/or are available in their monitoring software 344. In addition, audio from the emergency services is captured, encoded by the audio and video encoder/decoder 343 and is transmitted back to the emergency button 320 for output on the speaker of the emergency button 320.

In response, audio communications are enabled for emergency services with the user of the emergency button 320 at 1250. Thereafter, a typical emergency, 911 call takes place, where the emergency services operator obtains location information, information about the state of the emergency, and its urgency and the type of response that is requested or that would be suitable for this emergency.

Thereafter, the process ends at 1295.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

The invention claimed is:

1. An emergency assistance system comprising:

an emergency device body comprising:

a button for initiating emergency assistance;

a video camera with a lens focal length in a plane substantially perpendicular to a face of the button;

a microphone for communicating with emergency services;

an emergency device cover, entirely covering the button, the microphone, and the video camera and removable from covering the button, the microphone and the video camera with minimal force; and wherein the emergency device body further includes a status indicator light, visible on a front face of the emergency device body and the emergency device cover includes an aperture through which the status indicator light may be seen when the emergency device cover is in place covering the button, the microphone, and the video camera.

2. The emergency assistance system of claim 1 wherein the emergency device cover is joined to the emergency device body by a selected one of: a hinge, a magnet, clips, a tether, frictional engagement, a break-away adhesive, a break-away plastic, or a raised ridge and corresponding depression.

3. The emergency assistance system of claim 1 wherein the status indicator light operates in different sequences, colors, or patterns to provide an indication of the status of the emergency assistance system when the emergency device cover is in place covering the button, the microphone, and the video camera.

4. The emergency assistance system of claim 1 further comprising:

at least one magnet affixed to an interior of the emergency device cover;

at least one counterpart magnet affixed to an exterior or housed within the emergency device body;

at least two corresponding alignment features, preventing placement of the emergency device cover on the emergency device body in all but one position, the at least two corresponding alignment features present in both the emergency device cover and the emergency device body.

5. The emergency assistance system of claim 1 further comprising a tether, joining the emergency device cover to the emergency device body so that the emergency device cover and the emergency device body remain joined by the tether following removal of the emergency device cover.

6. An emergency assistance system comprising:

an emergency device body, the emergency device body comprising:

a housing having a front face;

a button for initiating emergency assistance on the front face;

a video camera, affixed within the front face, for capturing video from the area in front of the emergency device body;

an illuminating LED light, including infrared lighting capability, on the front face;

other sensors on the front face;

a status indicator light, visible on the front face;

a microphone for communicating with emergency services; and a rigid, emergency device cover, entirely covering the front face and removable with minimal force, configured to prevent inadvertent engagement with the button and to provide privacy from the video camera, the rigid, emergency device cover not covering the status indicator light.

* * * * *